April 17, 1962 A. M. ARKELYAN ET AL 3,029,842
VALVE
Filed Nov. 13, 1958 4 Sheets-Sheet 1

Inventors
ADELE MARION ARKELYAN
CORWIN L. RICKARD
Soans, Anderson,
Luedeka & Fitch
Atty's

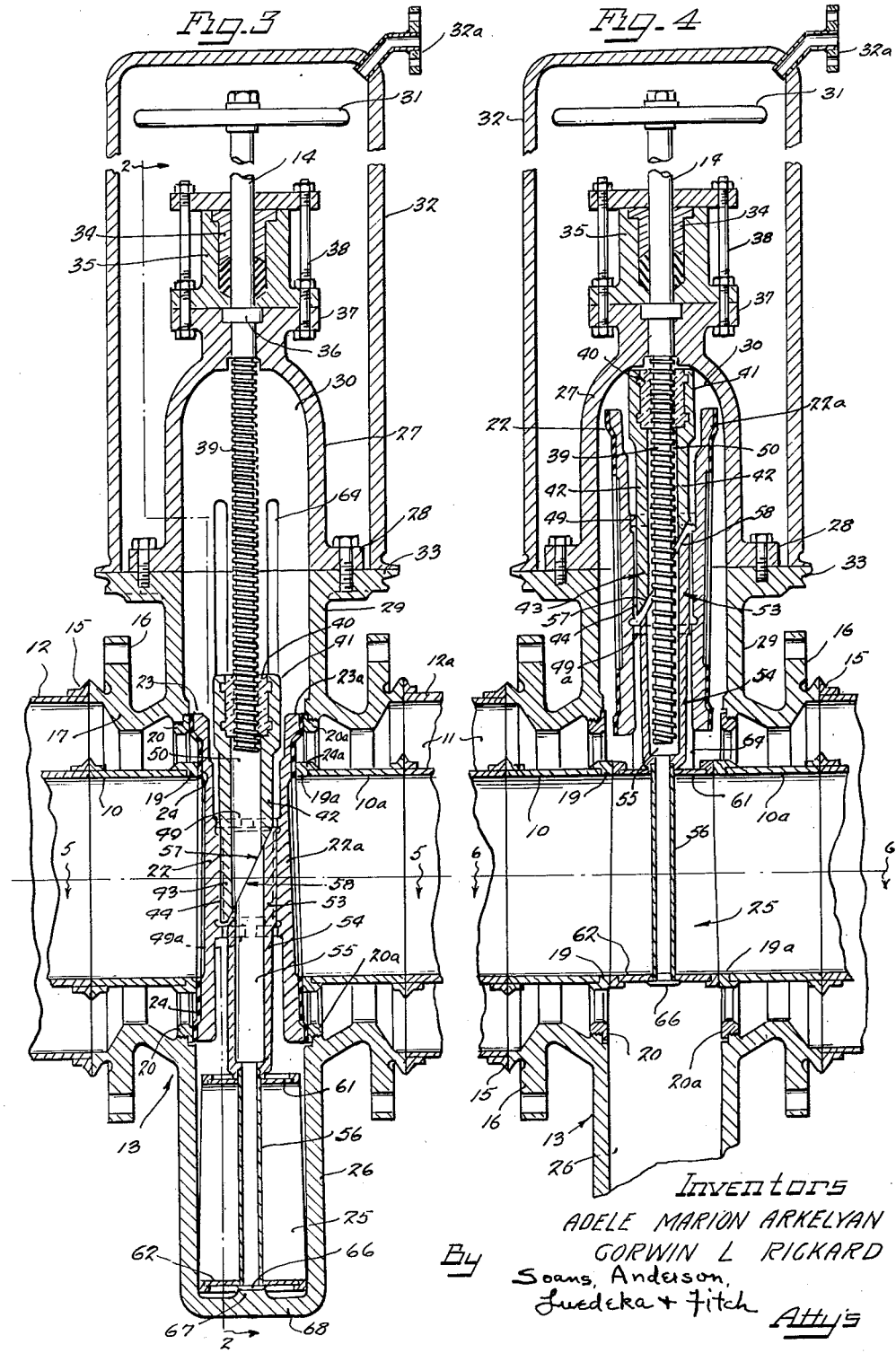

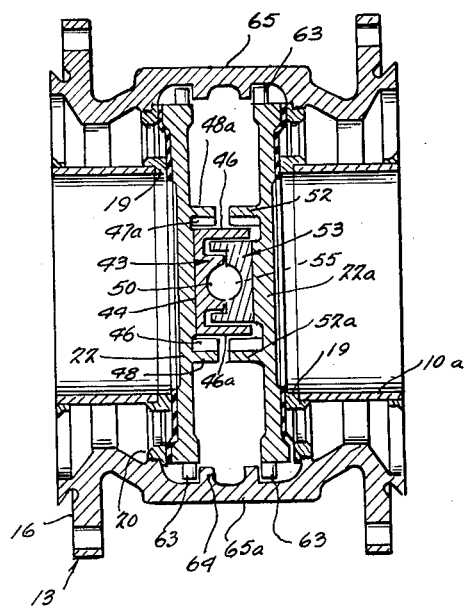
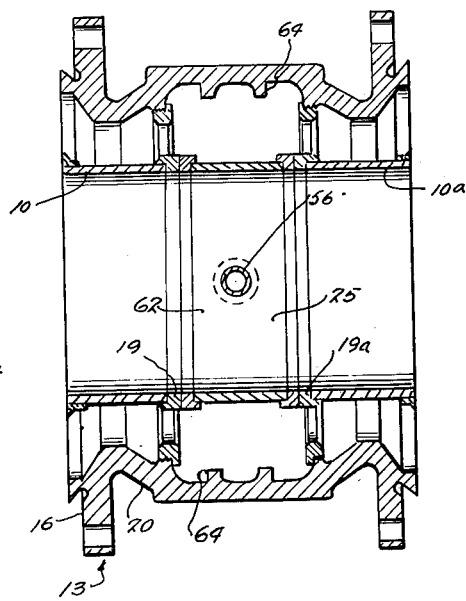
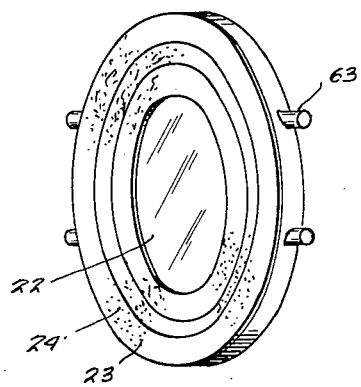
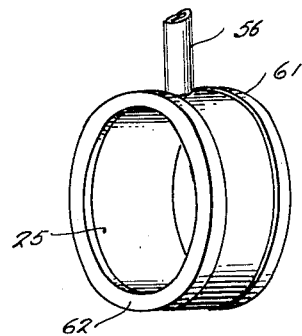

April 17, 1962   A. M. ARKELYAN ET AL   3,029,842
VALVE

Filed Nov. 13, 1958   4 Sheets-Sheet 4

₵ OF VALVE

Inventors
ADELE MARION ARKELYAN
CORWIN L. RICKARD
By Soans, Anderson,
Luedeka + Fitch
Att'ys

3,029,842
VALVE

Adele Marion Arkelyan, Del Mar, and Corwin Rickard, Solana Beach, Calif., assignors, by mesne assignments, to the United States of America as represented by the United States Atomic Energy Commission
Filed Nov. 13, 1958, Ser. No. 773,643
4 Claims. (Cl. 137—625.18)

The concentric duct valve made in accordance with our invention has various uses in connection with controlling the flow of fluid in separate ducts or channels by means of a single valve preferably contained in a unitary housing, but at least two ducts, one of which is a relatively smaller duct contained in and surrounded by a larger duct, the inner pipe serving to convey one of the streams of flowing fluid, while the other stream is contained in the space between the inner and the outer ducts.

Although the invention has many applications in cases where it is desired to separate such inner and outer flows, while at the same time controlling the same by a single valve, the invention will be described as applied to an arrangement for handling and controlling a central flow of inert gas, at a high temperature and pressure in a pipe surrounded by an outer pipe containing a return flow of the same type of gas at a substantially reduced temperature, but having a pressure of approximately the same order as that of the inner flow. Such an arrangement has particular utility in connection with nuclear reactors used in atomic power plants. The advantages of such an arrangement will be apparent when working with a hot inner flow of compressed gas at a temperature of the order of 1400° F., at a pressure of the order of 250 lbs. per square inch, in connection with a return outer flow of such gas at a temperature of the order of 650° F., at a pressure approximating that of the inner flow, in the annular space between the inner and the outer pipe of the arrangement.

One of the principal advantages of such an arrangement is that the outer wall of the piping can be kept at a relatively low temperature so that the tensile strength of the metal of the outer pipe is not seriously reduced. At the same time, although the tensile strength of the metal in the inside pipe is substantially reduced, the difference in pressure between the two flows is relatively small so that the reduction in tensile strength of the metal of the inner pipe due to the high temperature presents no problem.

With a valve made in accordance with our invention, we are able to control simultaneously the flow of fluids through the inner and the outer pipes of the system by a relatively simple valve arrangement contained in a unitary housing with the same facility as is the case in an ordinary gate valve arrangement for controlling a single flow, while preserving the separate integrity of the inner and outer flows when the valve is open.

The drawings accompanying this application show a preferred embodiment of a concentric gate valve for the purpose described. In said drawings:

FIGURE 3 is a section taken on the line 3—3 of FIGURE 1, showing both ducts closed;

FIGURE 4 is a section similar to FIGURE 3, but with the gate valve elements withdrawn and both ducts in open position;

FIGURE 5 is a section taken on the line 5—5 of FIGURE 3;

FIGURE 6 is a section taken on the line 6—6 of FIGURE 4;

FIGURE 7 is a perspective view of one of a pair of gate elements;

FIGURE 8 is a perspective view of the sleeve for effecting separation of the two flows when the valve is in the open position;

Figure 1:
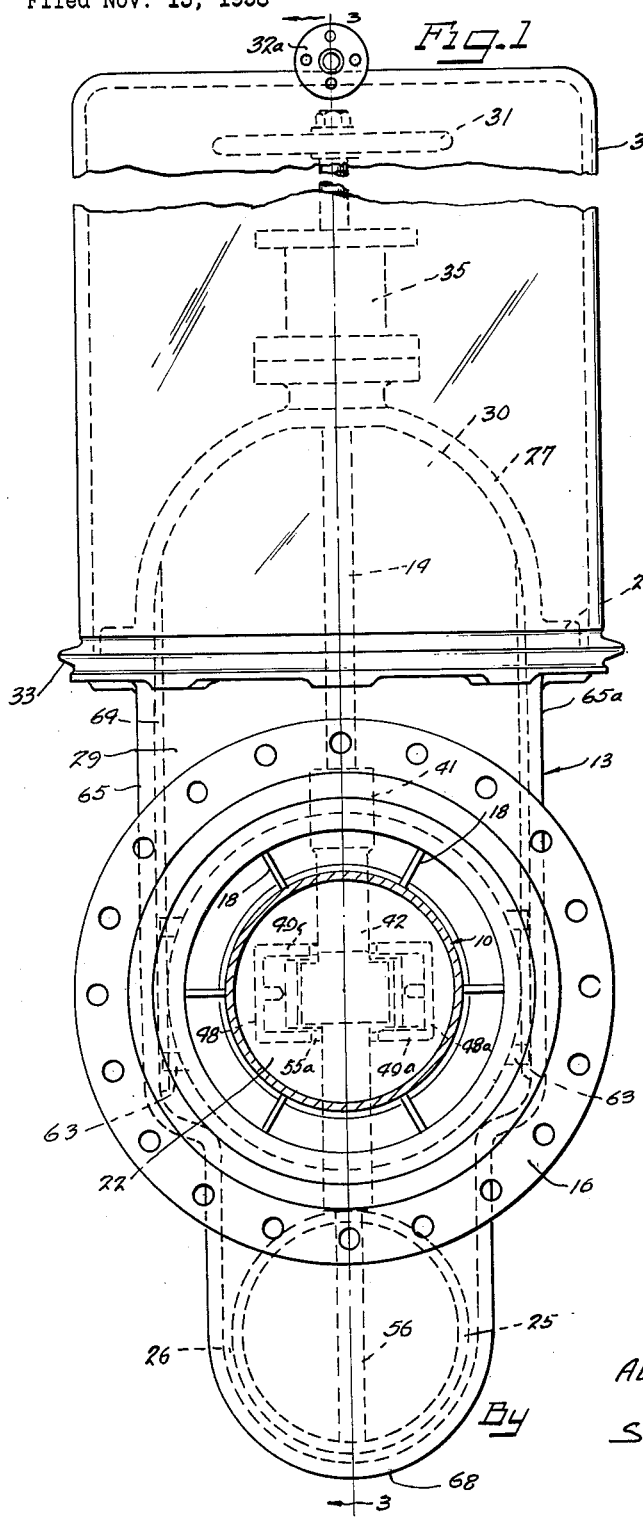
FIGURE 1 is an end view of the valve arrangement showing the central pipe in section and the outer pipe removed.

Referring to the drawings, the element 10 represents the horizontal central pipe or conduit which, in the present instance, is used to convey a high temperature fluid, for example, a gas such as helium or $CO_2$, at a temperature of between 1000° and 2000° F. The pressure of this gas may be as high as 250 lbs. to 750 lbs. per square inch. The outer or return flow of gas is accommodated in the annular space 11 between the pipe 10 and the outer pipe 12, indicated in FIGURE 3 of the drawings. The run of these two concentric pipes is interrupted sufficiently to permit the insertion of the valve housing which, as a whole, may be represented by the numeral 13. Said valve housing 13 is symmetrical in design on either side of a central vertical plane perpendicular to the axes of the said pipes 10 and 12, and in which plane there is located the longitudinal axis of the vertical valve actuating rod or stem 14.

The end of the pipe 12 is welded or otherwise united to an annular flange or ring 15 and said ring 15 is, by suitable bolts or otherwise, united to the outer flange 16 of a short duct or neck 17 on the side of the valve housing 13. The inside pipe 10 is supported concentrically within the pipe 12 by means of thin webs such as are shown at 18 (see FIGURE 1), extending radially between the pipe 10 and the neck 17. The inner end of the central pipe 10 is welded or otherwise secured to an annular valve seat 19, and the inner end of the neck 17 is fitted with a ring 20 serving as a valve seat for the annular duct between the neck 17 and the inner pipe 10.

In the closed position, the flow through the pipes 10 and 12 is shut off by the disc 22 (see also FIGURE 7), the outer end 23 of the disc being in engagement with the valve seat 20 and having an inner annular face 24 engaging the face of the inner valve seat 19. It will be understood that the arrangement above described is symmetrical as to both sides of the valve, there being a corresponding valve plate or disc 22a which serves to seal the opposing ends 10a and 12a of the pipes connected to the opposite side of the valve housing. Means for forcing the valve discs or elements 22 and 22a away from each other and into tight fitting contact with the inner and outer pairs of the concentric valve seats will be subsequently described in detail.

By means which will be described later, the valve discs 22 and 22a may be moved from the closed position shown in FIGURE 3 to the open position shown in FIGURE 4. In the open position shown in FIGURE 4, it is necessary not only to provide a channel connecting the pipes 10 and 10a, but it is also necessary to close the gap between the ends of said pipes. To this end, there is provided a gap-filling pipe section 25 which takes the form of a transverse bridging section of a tubular cylinder, the diameter which matches the diameter of the inner pipe 10. The ends of this gap-filling hoop or cylinder section 25 are flat so as to fit the oppositely-disposed annular valve seats 19 and 19a, but the planes of the respective ends of this gap-filling section are inclined from the perpendicular to the extent of one-half degree or so, so as to provide a slight wedging action between the hoop and the valve seats when the hoop 25 is drawn into the seated position shown in FIGURE 4. In that position, said hoop 25 serves to bridge the gap between the spaced ends of the inner pipe sections 10 and 10a and thereby prevent the central flow in the pipe 10 from commingling with the flow of fluid in the outer annular space between the two pipes. The means for moving this bridging element 25 from its operative position shown in FIGURE 4 to its inoperative position shown in FIGURE 3 will be described later in this specification. However, it may be said at this time that when said element 25 is in its inoperative position, it is wholly contained within a well or recess 26, formed as a part of the lower end of the housing 13.

Describing now the means for moving the main valve discs 22 and 22a from the closed position of FIGURE 3 to the open position shown in FIGURE 4, it will be seen from an examination of FIGURE 3 that the upper end of the housing 13 is constructed with a bonnet 27 having a flanged connection 28 with the upper end of a neck 29 extending from the main portion of the valve housing. Said bonnet 27 and neck 29 collectively provide a space 30 which, as shown in FIGURE 4, is large enough to accommodate both of the valve discs 22 and 22a when they are withdrawn from the closed position shown in FIGURE 3 to the open position shown in FIGURE 4.

Preferably, the stem 14 is rotated by a remotely controlled electric motor, but for purposes of simplicity, the drive is here indicated as a hand wheel 31. Said power applying means may be contained within an upper housing or hood 32, the lower end of which is secured to the margin of the flange 33 surrounding the upper end of the neck 29 of the valve housing.

The valve, in the present instance, is of the non-rising stem type. Its stem 14 extends through the bushing 34 of a gland housing 35 mounted on the upper end of the bonnet 27. A longitudinal movement of the stem 14 in the housing 35 is prevented, and rotary movement of the stem 14 is permitted, by a collar 36 positioned in a circular recess formed in the flange 37 which supports the housing 35 and to which said housing 35 is secured by suitable bolts 38. The hood 32 may be exhausted by a vacuum pump connected to the flange 32a.

Figure 9:
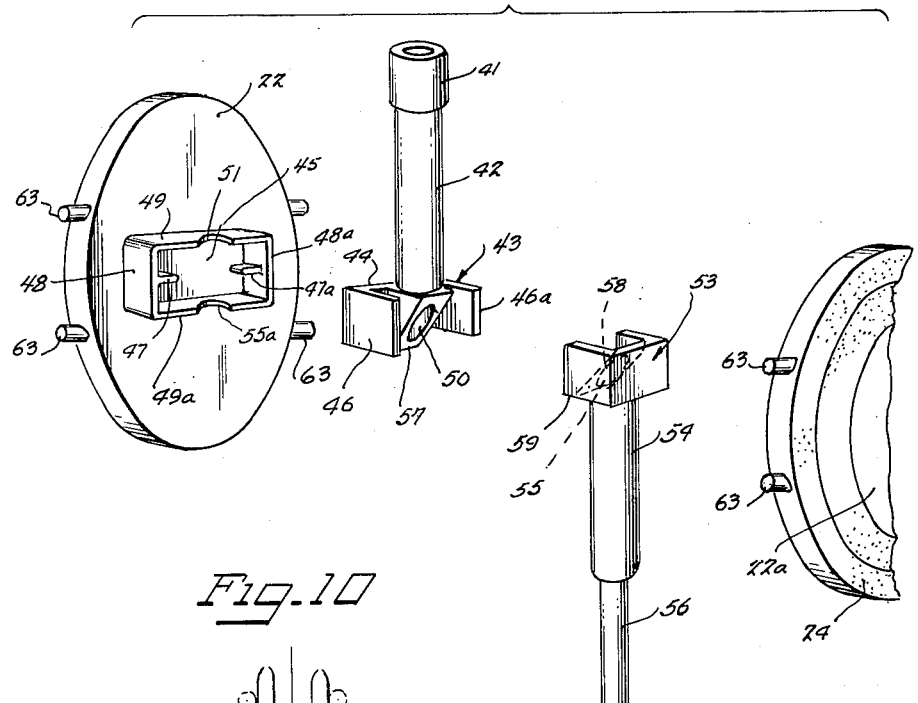
FIGURE 9 is an exploded perspective view of the discs and the interposed wedging elements.

Rotary power is applied to the upper end of the stem 14 by hand or otherwise as has been described. The stem 14 below the collar 36 extends down through the top of the bonnet 27 and its lower end has the usual threads 39. The lower end of said threaded stem 39 coacts with a nut 40 which is fixed in the end of a head 41 carried by a tubular valve lifter or spreader 42, the lower end of which is fitted with a rectangular wedge block indicated generally as 43, see FIGURE 9. Said wedge block 43, as shown also in FIGURE 5, is U-shaped in plan and fits within a rectangular, box-like pocket formed integral with the face of the valve disc 22. The rear face 44 of the wedge block 43 is adapted to have a limited sliding movement on that part of the face of the disc 22 which constitutes the bottom 45 of said pocket.

Lateral horizontal movement of the wedge block 43 in the pocket is limited by the wings 46 and 46a of the wedge block which fit between horizontally extending ribs 47 and 47a formed as inwardly extending, integral portions of the vertically extending side walls 48 and 48a of the pocket. The vertical depth of the wedge block 43 and its wings 46 and 46a is less than the internal spacing between the upper walls 49 and 49a of the pocket, so that the wedge block 43, when moved vertically by the stem 42, has a limited amount of vertical play in the pocket, as shown best in FIGURE 2.

Since the valve is of the non-rising stem type, the lower end of the screw 39 is accommodated in a bore 50 extending axially downwardly through the stem 42. The stem 42 is accommodated in a semi-circular notch 51 in the front edge of the upper wall 49 of the pocket (see FIGURE 9).

Figure 2:
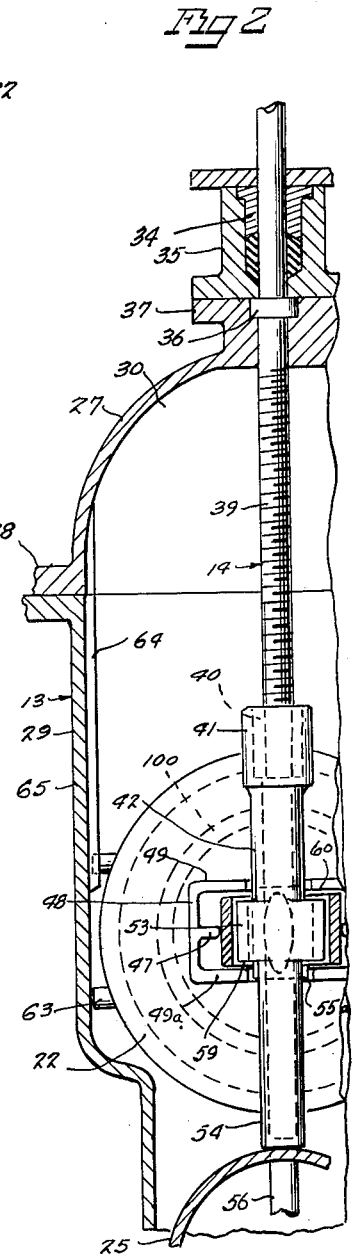
FIGURE 2 is a view showing a portion of FIGURE 1 in vertical section.

The other gate disc 22a is constructed with a pocket similar to the pocket just described (see FIGURE 7). The laterally spaced side walls or flanges 52 and 52a of said pocket on disc 22a provide guides cooperating with the outer ends of the wings 46 and 46a of the wedge block 43. Also, the spacing between the inside surfaces of said wings 46 and 46a is such as to permit relative sliding movement of the complementary wedge block 53 horizontally and vertically between said wings (see FIGURE 9). A slight amount of play is provided between the block 53 to permit a suitable amount of relative upward movement of the wedge block 53 and the upper and lower walls of its pocket, as shown in FIGURES 1 and 2.

The complementary wedge block 53 (see FIGURE 9) is provided with a downward extension 54 and is bored out to accommodate the screw 39, as shown at 55, in vertical alignment with the aperture 50 in the stem 42 of the lifter. It will be understood that the bores 50 and 55 in the wedging elements and the stems 42 and 54 thereof, are somewhat larger than the diameter of the screw 39 so as to permit a limited amount of lateral, horizontal movement of the two wedge blocks 43 and 53 when the valve is raised and lowered. The lower wall 49a of the box or pocket is also notched out as shown at 55a in order not to interfere with the stem 54, depending from the complementary wedge block 53.

It will be observed that to the lower end of the stem 54, there is rigidly secured a hollow lifter rod 56 which extends through and diammetrically between opposite sides of the bridge section 25 contained in the well 26. The lower end of said tube or rod 56 is welded into the bottom of the bridge member 25 and the upper end thereof is also not only connected to the lower end of the lifter 54, but is also connected to the upper side of the bridge element 25, so that when the lower stem 54 is moved vertically in any manner, such vertical movement will be imparted to the bridging pipe section 25.

When the valve stem 14 is rotated so as to pull up the lifter 42 and with it the wedge block 43, the first part of the movement will serve to take up any play between the top of the wedge block 43 and the upper wall 49 of the pocket on the disc 22. Also, at the same time, a little space will be created between the wedge surface 57 on the upper wedge block, and a corresponding wedge surface 58 on the lower or complementary wedge block 53, so that the two wedge blocks can then move horizontally towards each other a limited amount in order to free the discs from their seats.

Continued upward movement of the stem 42 and wedge block 43 will cause the complementary wedge block 53 to be raised by reason of the fact that the lower face 59 of the wedge block 53 will be engaged by the upper face of the wall 49a (see FIGURE 9) of the pocket in the other valve disc 22. Said movement of the block 53 in an upward direction due to the movement of the main stem 42 will also be communicated to the valve disc 22a by reason of the fact that the upper face of the block 53 after any play has been taken up, will be in contact with the lower face of the top wall 60 (see FIGURE 2) of the pocket carried by the valve disc 22a.

Thereafter, when all play has been taken up between the various parts, the stems 42 and 54 with their wedge blocks 43 and 53 and the discs 22 and 22a will move vertically as a single unit. Incidentally, that same vertical movement will be imparted to the lifter rod 56 and with it, the bridge section 25. The result will be that the valve discs 22 and 22a will be pulled up into the dome or space 30, and incidentally, the bridge section 25 will be pulled up into position to bridge and seal the gap between the valve seats 19 and 19a of the central piping 10 so as to prevent the high temperature gas from entering the annular space 11 between the inner and the outer pipes of the system, or into any open spaces in the valve housing.

Since the upper portion 61 of the bridge section 25 preferably should be narrower than the lower side 62 of the bridge section 25, the valve seats 19 and 19a for the bridging section 25 or hoop must be correspondingly inclined or slanted from a vertical plane extending perpendicularly to the axis of the pipe 10. Also, it will be understood that in drawing the bridge section or hoop 25 inwardly from the position shown in FIGURE 3 to the position shown in FIGURE 4, the bottom portion 62 of the hoop must pass through the space between the lower ends of the outer valve seats 20 and 20a against which the lower ends of the discs are engaged when the discs are closed. Also, the distance between the upper ends of the valve seats 19 and 19a is significantly less than the distance between the lower ends of the valve seats 20 and 20a. Hence, in order to permit the lower ends of the pair of discs to be drawn through the opening between the upper portions of the valve seats 19 and 19a, means are provided to reduce the distance between the lower ends of the discs when the discs are drawn upwardly from the position shown in FIGURE 3 to the position shown in FIGURE 4.

Figure 10:
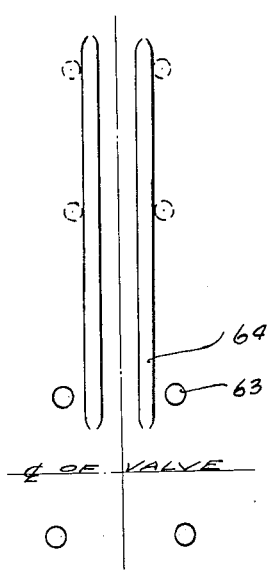
FIGURE 10 is a fragmentary, diagrammatic side elevation of the guide pins on the discs and the stationary grooves by which they are guided.

In the present instance, we have shown such an arrangement in FIGURE 10, which is a partial elevation of the inside wall of the main opening in the valve housing (see also FIGURES 5, 6 and 7). An examination of said figures will show that each of the valve discs is provided with two opposite pairs of horizontally extending projections, such as pins 63, which ride upwardly in and are guided by a pair of ribs 64 formed on the inside faces of the walls 65 and 65a of the valve housing. It will be noted that the pins 63 of each disc are disposed in a plane inclined at a slight angle to the vertical when the disc sealingly engages seats 19, 20. The ribs 64, however, are vertical. Hence upon upward movement of the discs, the upper sets of pins 63 bear against the ribs and the forces therebetween include longitudinal components which are directed such that the inclined planes of the pins are urged into alignment with the ribs. Such orientation of the pins draws the lower ends of the discs proximally during the upward movement of same and thereby facilitates free passage of the discs through the reduced space between the upper ends of the inclined valve seats 19 and 19a.

It will be understood that when the valve is moved from its open condition as shown in FIGURE 4 to the closed position shown in FIGURE 3, the vertical spacing of the various parts partaking of the downward movement will be substantially the same. However, when the lower end 66 on the end of the rod 56 strikes a small boss 67 on the bottom wall 68 of the well 26, the lower stem 54 will be arrested in its downward movement, whereupon further downward movement of the stem 42 will cause the wedge surface 57 to slide on the wedge surface 58, spreading apart the discs 22 and 22a. That spreading movement will cause the outer annular faces 23 and 23a of the discs to make effective sealing engagement with the outer valve seats 20 and 20a of the housing 13. Similarly, the inner annular faces 24 and 24a of the discs 22 and 22a will make sealing contacts with the valve seats 19 and 19a on the ends of the pipe sections 10 and 10a. Thus, both ends of the inner pipe sections 10 and 10a will be closed, and at the same time, both ends of the outer pipe sections 12 and 12a will be closed.

It should be understood that when the valve is in the open position as shown in FIGURE 4, in the example described it is not necessary to provide a bridging connection between the outer pipes 12 and 12a, for the reason that the temperature of the gas contained in the annular space between the inner and outer pipes of the system is not usually more than 500 or 600° F., which is not sufficient to weaken the strength of the metal of the valve housing to any serious extent, nor is there any harm done if the gas, in this case helium or $CO_2$, is allowed to enter the well 26 or the bonnet 27.

Various of the features of the invention believed to be new are set forth in the appended claims. The terms "vertical," "upwardly," "downwardly" and the like, as employed hereinbefore in the description and hereinafter in the claims are not intended as absolute limitations, but are used only for purposes of convenience in describing the structural relation and operation of the various elements. It is to be understood that the invention is not limited to horizontally disposed pipes having an interposed valve in which the stem extends vertically upwardly, the other elements having corresponding orientations. The valve can be incorporated in a pipe having any orientation provided only that the valve stem is disposed perpendicularly to the axis of pipes and that the other elements have corresponding orientations.

We claim:

1. A valve for controlling the flow of fluid in separate concentric pipes comprising a gate valve housing interposed between and connecting spaced sections of said pipes, said housing having spaced opposed outer ducts leading to the sections of the outer pipe and valve seats surrounding the inner ends of the outer ducts, said housing having spaced opposed inner ducts leading to the respective sections of the inner pipe and valve seats surrounding the inner ends of the inner ducts concentrically with said valve seats at the inner ends of the outer ducts, the sealing surface of each of said valve seats at the inner ends of said inner ducts being formed in a plane, which planes upwardly converge with respect to a vertical plane perpendicular to the axis of said pipes, a pair of valve discs respectively having concentric outer and inner annular faces for sealingly engaging the concentric seats at the inner ends of the ducts, said inner faces being inclined to conform to the sealing surfaces of said valve seats at the inner ends of said inner ducts, a vertical valve stem extending through said housing and operatively secured to said discs for translating the discs between a closed position in tight-fitting contact with the seats and an open position vertically displaced upwardly therefrom within the housing, guide means disposed at the inside faces of the side walls of the housing and engaged by the discs to draw the lower ends of the discs toward each other for passage between the upper ends of the inclined seats at the inner ends of said inner ducts as the discs are displaced upwardly to said open position, an auxiliary duct section for bridging the gap between said valve seats at the inner ends of said inner ducts when the discs are in said open position, said auxiliary duct having inclined end faces conformed thereto, and a valve stem extension projecting vertically downward from said valve stem and end connected to said auxiliary duct section for moving it into tight-fitting bridging engagement between the valve seats at the inner ends of said inner ducts when the discs are in said open position.

2. A valve according to claim 1 further defined by said valve stem being threaded at its lower end and journaled for rotation within the housing about a vertical axis between said seats, a valve lifter having a head carrying a nut centrally thereof in threadable engagement with the threaded end of said stem, said lifter having a wedge block at its lower end with the block having a rear wall with a central wedge surface upwardly inclined from the horizontal and side wings projecting perpendicularly inward from the ends of the rear wall in oppositely laterally spaced relation to the wedge surface to define a U-shape in plan, said stem extension having a wedge block at its upper end complementary to said first wedge block, said second wedge block being U-shaped in plan to include a rear wall with side wings projecting perpendicularly inward from its ends and a wedge surface intimately interposed therebetween and downwardly inclined from the horizontal, said side wings of the second block disposed in the spaces between the wedge surface and side wings of the first block and in loose engagement therewith, said lifter and extension having aligned axially extending bores through the wedge surfaces of said first and second blocks and of greater diameter than said stem for freely receiving the threaded end thereof, and a pair of like rectangular boxlike pockets respectively defined by vertically spaced top and bottom walls and laterally spaced interconnecting side walls projecting inwardly from said valve discs, said pockets supporting said wedge blocks, said top and bottom walls of the pockets notched to accommodate traversal of the lifter and extension, said top and bottom walls of the pocket internally spaced by an amount greater than the vertical height of said blocks to accommodate a limited amount of vertical play of the blocks within the pockets.

3. A valve for controlling the flow of fluid in separate concentric pipes comprising a gate valve housing interposed between and connecting spaced sections of said pipes, said housing having spaced opposed outer ducts leading to the sections of the outer pipe and valve seats surrounding the inner ends of the outer ducts, said housing having spaced opposed inner ducts leading to the respective sections of the inner pipe and valve seats surrounding the inner ends of the inner ducts concentrically with said valve seats at the inner ends of the outer ducts, a pair of valve discs respectively having concentric outer and inner annular faces for sealingly engaging the seats at the inner ends of the ducts, said valve discs being moveable relative to a position of sealing engagement with said seats, a vertical valve stem extending through said housing and threaded at its lower end, said valve stem journaled for rotation about a vertical axis intermediate said discs, a valve lifter having a head carrying a nut centrally thereof in threadable engagement with the threaded end of said stem, said lifter having a wedge block at its lower end with the block having a rear wall with a central wedge surface upwardly inclined from the horizontal and side wings projecting perpendicularly inward from the ends of the rear wall in oppositely laterally spaced relation to the wedge surface to define a U-shape in plan, an auxiliary duct section for bridging the gap between said inner valve seats when said discs are moved from their position of sealing engagement with said seats, a valve stem extension connected at its lower end to said auxiliary duct section and coaxially disposed relative to said valve stem and said lifter, said extension having a wedge block at its upper end complementary to the wedge block of said lifter, said second wedge block being U-shaped in plan to include a rear wall with side wings projecting perpendicular inward from its ends and a wedge surface interposed therebetween and downwardly inclined from the horizontal, said side wings of the second block disposed in the spaces between the wedge surface and side wings of the first block and in loose engagement therewith, said lifter and extension having aligned axially extending bores through the wedge surfaces of said first and second blocks and of greater diameter than said stem for freely receiving the threaded end thereof, and a pair of like rectangular boxlike pockets respectively defined by vertically spaced top and bottom walls and laterally spaced side walls projecting inwardly from said valve discs, said pockets supporting said wedge blocks, said top and bottom walls of the pockets notched to accommodate traversal of the lifter and extension, said top and bottom walls of the pockets spaced by an amount greater than the vertical height of said blocks to accommodate a limited amount of vertical play of the blocks within the pockets.

4. A valve for controlling the flow of fluid in separate concentric pipes comprising a gate valve housing interposed between and connecting spaced sections of said pipes, said housing having spaced opposed outer ducts leading to the sections of the outer pipe and valve seats surrounding the inner ends of the outer ducts, said housing having spaced opposed inner ducts leading to the respective sections of the inner pipe and valve seats surrounding the inner ends of the inner ducts concentrically with said valve seats at the inner ends of the outer ducts, a pair of valve discs respectively having concentric outer and inner annular faces for sealingly engaging the seats at the inner ends of the ducts, said valve discs being moveable relative to a position of sealing engagement with said seats, a vertical valve stem extending through said housing and threaded at its lower end, said valve stem journaled for rotation about a vertical axis intermediate said discs, a valve lifter having a head carrying a nut centrally thereof in threadable engagement with the threaded end of said stem, said lifter having a wedge block at its lower end with a wedge surface upwardly inclined from the horizontal, an auxiliary duct section for bridging the gap between said inner valve seats when said discs are moved from their position of sealing engagement with said seats, a valve stem extension connected at its lower end to said auxiliary duct section and coaxially disposed relative to said valve stem and said lifter, said extension having a wedge block at its upper end with a wedge surface complementary to the wedge surface of the block of said lifter and downwardly inclined from the horizontal, said lifter and extension having aligned axially extending bores through the wedge surfaces of said first and second blocks and of greater diameter than said stem for freely receiving the threaded end thereof, and a pair of like rectangular box like pockets respectively defined by vertically spaced top and bottom walls and laterally spaced side walls projecting inwardly from said valve discs, said pockets supporting said wedge blocks, said top and bottom walls of the pockets notched to accommodate traversal of the lifter and extension, said top and bottom walls of the pockets spaced by an amount greater than the vertical height of said blocks to accommodate a limited amount of vertical play of the blocks within the pockets.

References Cited in the file of this patent

UNITED STATES PATENTS

| 955,334 | Hoefer | Apr. 19, 1910 |
| 2,002,062 | Howard | May 21, 1935 |

FOREIGN PATENTS

| 655,493 | Germany | of 1938 |
| 871,238 | Germany | of 1953 |